United States Patent
Kaneko

(10) Patent No.: US 9,252,885 B2
(45) Date of Patent: Feb. 2, 2016

(54) METHOD FOR MANUFACTURING WAVELENGTH DIVISION MULTIPLEXING TRANSMISSION APPARATUS AND WAVELENGTH DIVISION MULTIPLEXING TRANSMISSION APPARATUS

(71) Applicant: Mitsubishi Electric Corporation, Tokyo (JP)

(72) Inventor: Shinichi Kaneko, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 8 days.

(21) Appl. No.: 14/243,026

(22) Filed: Apr. 2, 2014

(65) Prior Publication Data

US 2015/0037037 A1 Feb. 5, 2015

(30) Foreign Application Priority Data

Aug. 1, 2013 (JP) .................. 2013-160427

(51) Int. Cl.
*H04J 14/02* (2006.01)
*H04B 10/50* (2013.01)

(52) U.S. Cl.
CPC ............ *H04B 10/503* (2013.01); *H04B 10/506* (2013.01); *H04J 14/02* (2013.01); *Y10T 29/49016* (2015.01)

(58) Field of Classification Search
CPC ..... H04B 10/503; H04B 10/506; H04J 14/02; H04J 14/00; H04J 4/002; H04J 14/04; H04J 14/08; Y10T 29/49016
USPC ..................................... 398/79, 88
See application file for complete search history.

(56) References Cited

U.S. PATENT DOCUMENTS

| 9,065,587 | B2 * | 6/2015 | Sorin et al. |
| 2007/0122154 | A1 | 5/2007 | Nakanishi et al. |
| 2009/0103923 | A1 | 4/2009 | Hosomi et al. |

FOREIGN PATENT DOCUMENTS

| JP | 61-103110 A | 5/1986 |
| JP | 2000-180797 A | 6/2000 |
| JP | 2005-140960 A | 6/2005 |
| JP | 2005-309370 A | 11/2005 |
| JP | 2006-285087 A | 10/2006 |
| JP | 2009-105106 A | 5/2009 |
| JP | 175875 * | 8/2010 ............... G02B 6/42 |
| JP | 2010-211164 A | 9/2010 |
| JP | 2010-286683 A | 12/2010 |

OTHER PUBLICATIONS

State Intellectual Property Office of the People'S Republic of China; Office Action in Chinese Patent Application No. 201410376876.6 (Sep. 2, 2015).

* cited by examiner

*Primary Examiner* — M. R. Sedighian
(74) *Attorney, Agent, or Firm* — Leydig Voit & Mayer

(57) ABSTRACT

A method for manufacturing a wavelength division multiplexing transmission apparatus, includes arranging laser devices in a line and fixing the laser devices to a first substrate, fixing to a second substrate reflectors arranged to multiplex laser beams emitted from the laser devices and to generate wavelength multiplexed light, and arranging collimator lenses on paths of the laser beams, adjusting positions of the collimator lenses so that the laser beams making up the wavelength multiplexed light become parallel and, thereafter, fixing the collimator lenses to the first substrate.

4 Claims, 9 Drawing Sheets

Comparative Example

METHOD FOR MANUFACTURING WAVELENGTH DIVISION MULTIPLEXING TRANSMISSION APPARATUS AND WAVELENGTH DIVISION MULTIPLEXING TRANSMISSION APPARATUS

BACKGROUND OF THE INVENTION

1. Field of the Invention

The present invention relates to a method for manufacturing a wavelength division multiplexing transmission apparatus mounted, for example, in an optical transceiver and used for an optical communication system and the wavelength division multiplexing transmission apparatus manufactured using the manufacturing method.

2. Background Art

In order to miniaturize optical transceivers in response to drastically increasing communication capacity in recent years, there is a growing demand for miniaturization of wavelength division multiplexing transmission apparatuses. To meet this demand for miniaturization, a plurality of laser devices that emit laser beams of different wavelengths may be lined in an array. In this case, substantially parallel laser beams are emitted from the plurality of laser devices.

Japanese Patent Application Laid-Open No. 2010-211164 discloses a wavelength division multiplexing transmission apparatus provided with a plurality of laser devices arranged in a line. This wavelength division multiplexing transmission apparatus multiplexes laser beams emitted from the plurality of laser devices by an optical multiplexing section and generates multiplexed light.

Wavelength multiplexed light is incident on an optical fiber via a condensing lens. To increase coupling efficiency of the wavelength multiplexed light with respect to the optical fiber, it is desirable to increase parallelism of laser beams making up the wavelength multiplexed light or reduce displacement of laser beams making up the wavelength multiplexed light. However, increasing parallelism of laser beams making up the wavelength multiplexed light or reducing displacement of laser beams making up the wavelength multiplexed light would result in a problem that parts of the optical multiplexing section need to be assembled with high assembling accuracy.

SUMMARY OF THE INVENTION

The present invention has been implemented to solve the above-described problems, and it is an object of the present invention to provide a method for manufacturing a wavelength division multiplexing transmission apparatus with increased coupling efficiency of wavelength multiplexed light with respect to an optical fiber while relaxing the assembling accuracy that should be satisfied and the wavelength division multiplexing transmission apparatus.

The features and advantages of the present invention may be summarized as follows.

According to one aspect of the present invention, a method for manufacturing a wavelength division multiplexing transmission apparatus, includes a first step of arranging a plurality of laser devices in a line and fixing the laser devices to a first substrate, a second step of fixing to a second substrate, a plurality of reflectors arranged so as to multiplex laser beams emitted from the plurality of laser devices and generate wavelength multiplexed light, and a parallelism correction step of arranging collimator lenses on paths of the laser beams, adjusting positions of the collimator lenses so that the laser beams making up the wavelength multiplexed light become parallel and then fixing the collimator lenses to the first substrate, after the first step and the second step.

According to another aspect of the present invention, a method for manufacturing a wavelength division multiplexing transmission apparatus, includes a first step of fixing to a first substrate, a plurality of laser devices arranged in a line and a plurality of collimator lenses that collimate laser beams emitted from the plurality of laser devices, a second step of fixing to a second substrate, a plurality of reflectors arranged so as to multiplex the laser beams and generate wavelength multiplexed light, and a positional deviation correction step of adjusting an angle formed by the second substrate with respect to the first substrate so as to reduce an interval between the laser beams making up the wavelength multiplexed light, after the first step and the second step.

According to another aspect of the present invention, a wavelength division multiplexing transmission apparatus includes a first substrate, a plurality of laser devices arranged in a line and fixed to the first substrate, collimator lenses that collimate laser beams emitted from the plurality of laser devices, a lens part provided with a frame body having a polygonal outside shape surrounding the collimator lens, one of surfaces of the polygonal outside shape being fixed to the first substrate, a second substrate, and a plurality of reflectors that are fixed to the second substrate and multiplex the laser beams to generate wavelength multiplexed light, wherein a position of an optical axis of the collimator lens is away from a center of an outside shape of the frame body.

Other and further objects, features and advantages of the invention will appear more fully from the following description.

DETAILED DESCRIPTION OF THE PREFERRED EMBODIMENTS

Figure 1:
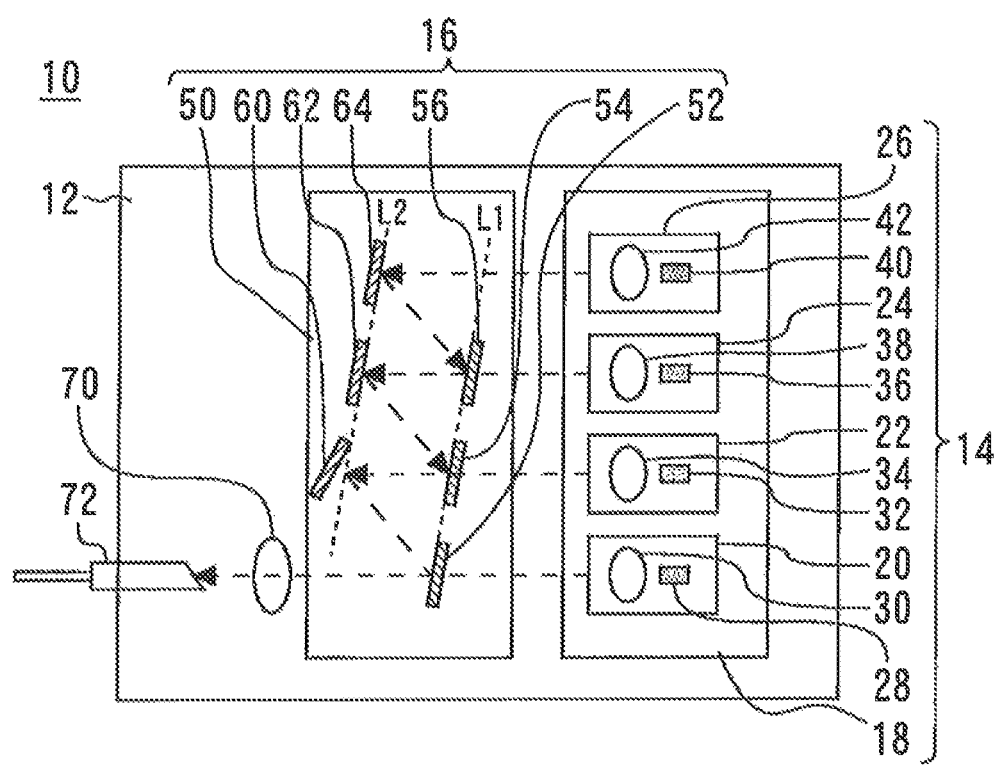
FIG. 1 is a plan view of a wavelength division multiplexing transmission apparatus according to a first embodiment.

A method for manufacturing a wavelength division multiplexing transmission apparatus and the wavelength division multiplexing transmission apparatus according to an embodiment of the present invention will be described with reference to the accompanying drawings. The same or corresponding components will be assigned the same reference numerals and duplicate description may be omitted.

First Embodiment

FIG. 1 is a plan view of a wavelength division multiplexing transmission apparatus 10 according to a first embodiment of the present invention. The wavelength division multiplexing transmission apparatus 10 is provided with a package 12. The package 12 accommodates a light transmitting section 14 that emits laser beams and an optical multiplexing section 16 that generates wavelength multiplexed light. A condensing lens 70 is placed on a path of the wavelength multiplexed light in the package 12. The package 12 is provided with an optical fiber 72 on which the light condensed by the condensing lens 70 is incident.

The light transmitting section 14 will be described. The light transmitting section 14 is provided with a first substrate 18. A first submount 20, a second submount 22, a third submount 24 and a fourth submount 26 are fixed onto the first substrate 18. A first laser device 28 and a first collimator lens 30 are fixed onto the first submount 20. A second laser device 32 and a second collimator lens 34 are fixed onto the second submount 22. A third laser device 36 and a third collimator lens 38 are fixed onto the third submount 24. A fourth laser device 40 and a fourth collimator lens 42 are fixed onto the fourth submount 26.

The first laser device 28, the second laser device 32, the third laser device 36 and the fourth laser device 40 respectively emit laser beams of different wavelengths. The first collimator lens 30, the second collimator lens 34, the third collimator lens 38 and the fourth collimator lens 42 are intended to collimate (transform into substantially parallel beams) laser beams respectively emitted from the first laser device 28, the second laser device 32, the third laser device 36 and the fourth laser device 40.

The optical multiplexing section 16 will be described. The optical multiplexing section 16 is provided with a second substrate 50. A first filter 52, a second filter 54 and a third filter 56 are fixed to the second substrate 50. The first to third filters 52, 54 and 56 are lined along a broken line L1.

Figure 2:
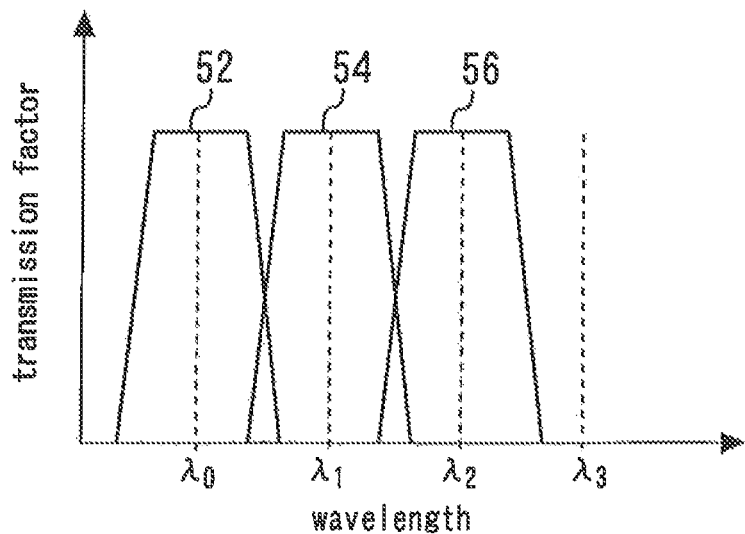
FIG. 2 is a diagram illustrating transmission characteristics of the first to third filters.

FIG. 2 is a diagram illustrating transmission characteristics of the first to third filters 52, 54 and 56. The first filter 52 allows a laser beam having wavelength λ0 emitted from the first laser device 28 to pass therethrough and reflects laser beams having other wavelengths. The second filter 54 allows a laser beam having wavelength λ1 emitted from the second laser device 32 to pass therethrough and reflects laser beams having other wavelengths. The third filter 56 allows a laser beam having wavelength λ2 emitted from the third laser device 36 to pass therethrough and reflects laser beams having other wavelengths.

FIG. 1 will be described again. A first reflector 60, a second reflector 62 and a third reflector 64 are fixed to the second substrate 50. The first to third reflectors 60, 62 and 64 are lined along a broken line L2. The first to third reflectors 60, 62 and 64 reflect laser beams of all wavelengths. Note that the broken line L1 and the broken line L2 are parallel.

The method for manufacturing a wavelength division multiplexing transmission apparatus according to the first embodiment will be described. First, the first to fourth laser devices 28, 32, 36 and 40 (hereinafter, collectively referred to as "a plurality of laser devices") are arranged in a line and fixed on their respective submounts to thereby fix the plurality of laser devices to the first substrate 18. Suppose this step is called a "first step."

Next, the first to third filters 52, 54 and 56, and the first to third reflectors 60, 62 and 64 (hereinafter, the first to third filters 52, 54 and 56, and the first to third reflectors 60, 62 and 64 are collectively referred to as "a plurality of reflectors") are fixed to the second substrate 50. The plurality of reflectors are arranged so as to be able to multiplex laser light emitted from the plurality of laser devices and generate wavelength multiplexed light. This step is called a "second step."

After the first step and the second step, the collimator lenses are arranged on the paths of laser beams. More specifically, the positions of the collimator lenses are adjusted so that laser beams making up the wavelength multiplexed light become parallel while causing laser beams emitted from the plurality of laser devices to impinge on the optical multiplexing section 16. By fixing the adjusted collimator lenses to the respective submounts, the collimator lenses are fixed to the first substrate 18. This step is called a "parallelism correction step."

With what positional variation the plurality of reflectors are fixed to the second substrate 50 varies from one optical multiplexing section 16 to another, and therefore the parallelism correction step is performed using the actual optical multiplexing section 16 and the light transmitting section 14 which is used together with the optical multiplexing section 16. Note that the parallelism correction step can be performed outside the package 12.

Figure 3:
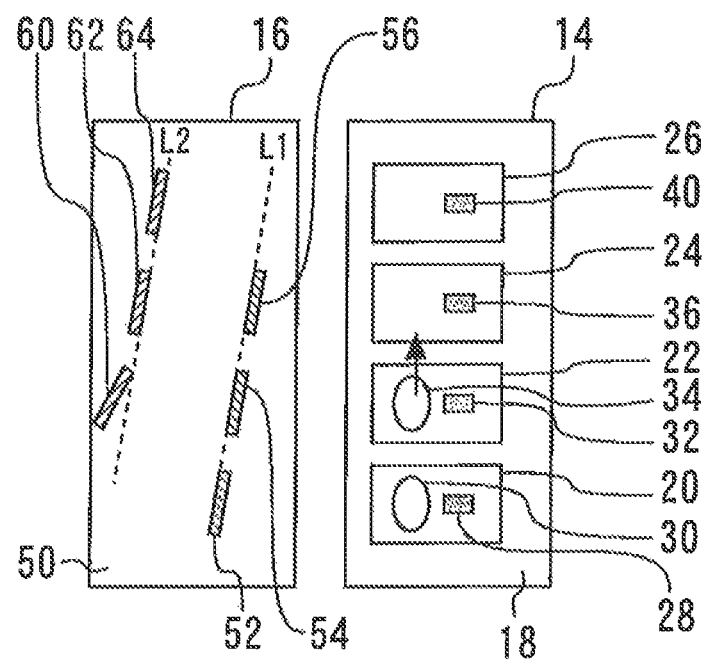
FIG. 3 is a plan view illustrating how to adjust the positions of the collimator lenses in the parallelism correction step.

FIG. 3 is a plan view illustrating how to adjust the positions of the collimator lenses in the parallelism correction step. It is ideal that the first to third filters 52, 54 and 56 be arranged along the broken line L1 without any deviation and the first to third reflectors 60, 62 and 64 be arranged along the broken line L2 without any deviation. However, certain deviations (errors) may be unavoidable. The first reflector 60 in FIG. 3 is deviated from the broken line L2.

Figure 4:
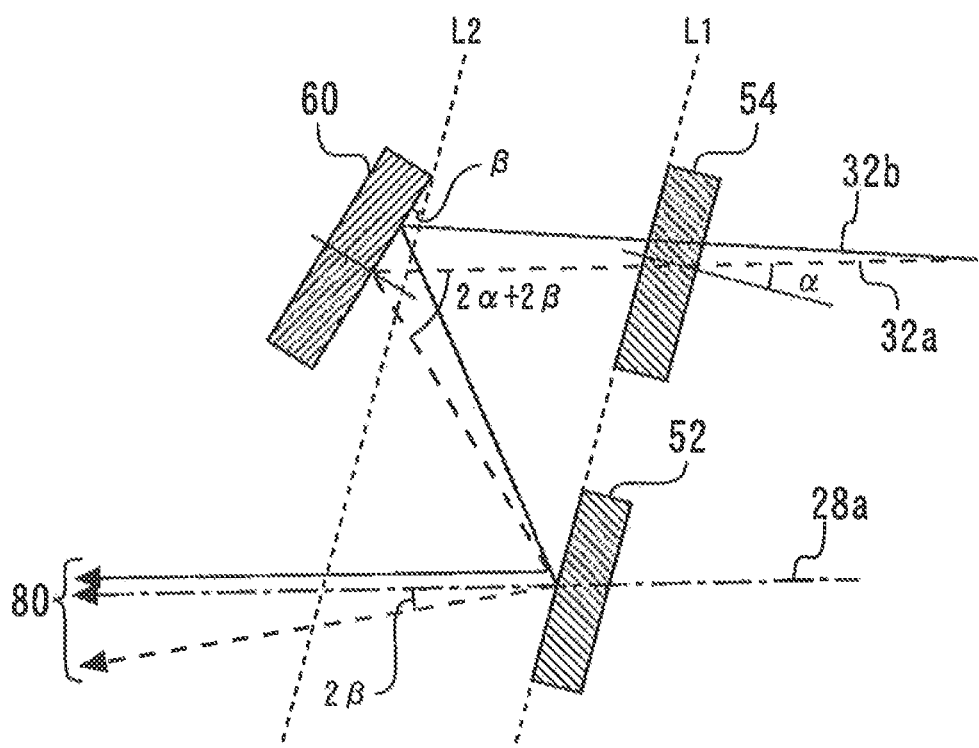
FIG. 4 is a diagram illustrating paths of a laser beams.

FIG. 4 is a diagram illustrating paths of a laser beam 28a emitted from the first laser device 28 and a laser beam emitted from the second laser device 32. The laser beam 28a shown by a single-dot dashed line passes through the first filter 52 and becomes part of wavelength multiplexed light 80. The laser beam 32a (shown by a broken line) emitted from the second laser device 32 passes through the second filter 54, is reflected by the first reflector 60 and then reflected by the first filter 52 and thereby becomes part of the wavelength multiplexed light 80.

Since the first reflector 60 is deviated by an angle β from the broken line L2, the laser beam 28a and the laser beam 32a making up the wavelength multiplexed light 80 do not become parallel. The angle formed by the laser beam incident on the optical multiplexing section and the laser beam emitted from the optical multiplexing section becomes 2β, twice the deviation angle β of the reflector 60. Therefore, when there is an angle deviation in the reflector, even if the laser beam emitted from the first laser device 28 and incident on the optical multiplexing section is parallel to the laser beam emitted from the second laser device 32 and incident on the optical multiplexing section, the laser beams making up the wavelength multiplexed light 80 never become parallel.

Thus, the position of the second collimator lens 34 is moved toward a direction shown by an arrow in FIG. 3 to change the laser beam 32a in FIG. 4 to the laser beam 32b shown by a solid line. This allows the laser beam 32b to impinge on the optical multiplexing section at an angle different from that of the laser beam 32a and allows the laser beam 28a and the laser beam 32b making up the wavelength multiplexed light 80 to become parallel. Thus, in the parallelism correction step, the positions of the collimator lenses are adjusted. The positions of the third collimator lens 38 and the fourth collimator lens 42 are also adjusted as required to increase parallelism of laser beams making up the wavelength multiplexed light.

Figure 5:
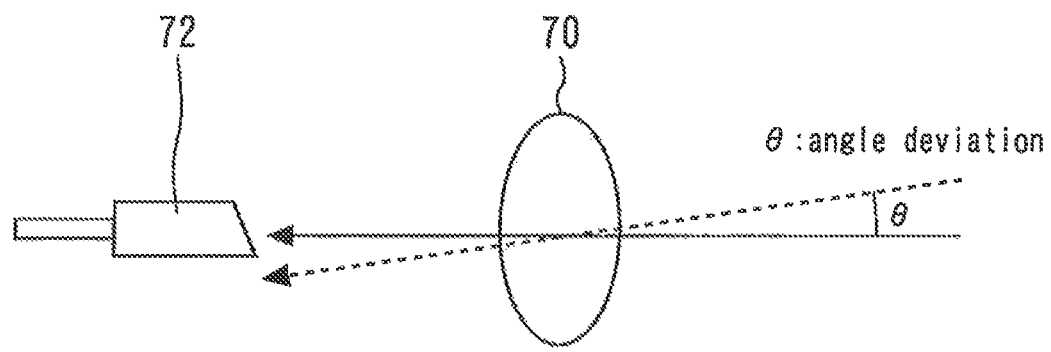
FIG. 5 is a diagram illustrating an angle deviation of laser beams making up wavelength multiplexed light.

FIG. 5 is a diagram illustrating an angle deviation of laser beams making up wavelength multiplexed light. Here, a condensing lens 70 having a focal length of 2 mm is used. FIG. 5 shows that the laser beams making up the wavelength multiplexed light has an angle deviation of angle θ. This angle deviation causes the coupling efficiency of the wavelength multiplexed light with respect to the optical fiber to decrease.

Figure 6:
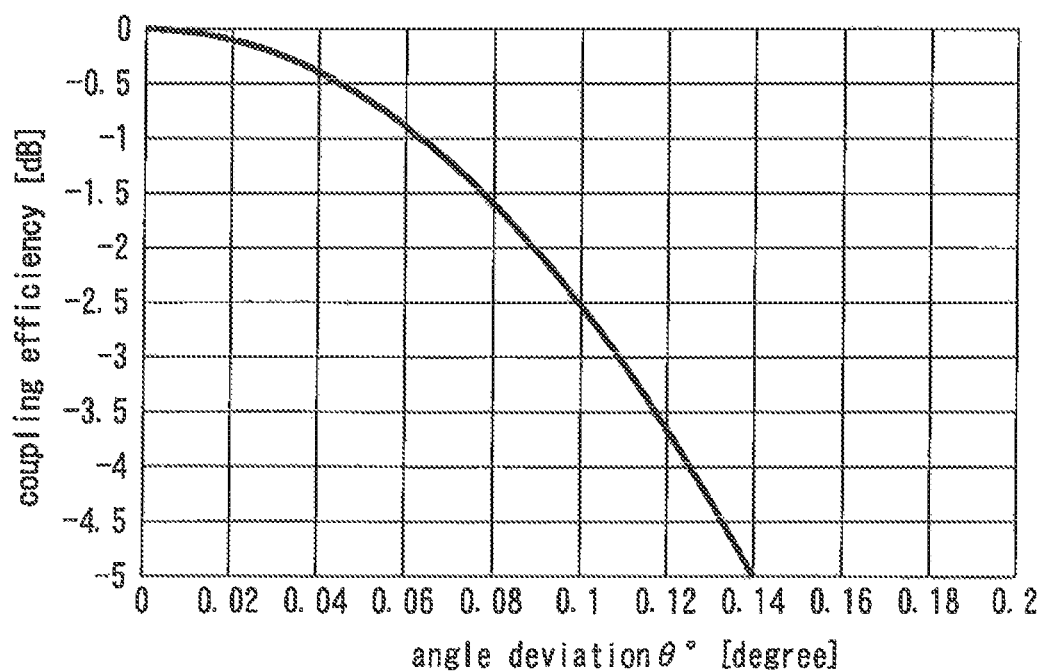
FIG. 6 is a graph showing results of calculation of the angle deviation and the coupling efficiency.

FIG. 6 is a graph showing results of calculation of the angle deviation θ and the coupling efficiency. It is clear from FIG. 6 that the angle deviation must be set to 0.04 degrees or less to reduce the coupling loss caused by the angle deviation to 0.5 dB or less. In this case, since the angle deviation caused by an assembly error between the light transmitting section and the optical multiplexing section as a whole must be set to 0.04 degrees or less, the angle deviation caused by an assembly error in the light transmitting section must be set to, for example, 0.02 degrees or less and the angle deviation caused by an assembly error in the optical multiplexing section must be set to 0.02 degrees or less.

Moreover, since an angle deviation between laser beams due to a deviation of a part (one of the plurality of reflectors) of the optical multiplexing section is twice the amount of deviation as described above, the assembly error of the part in the optical multiplexing section must be set to 0.01 degrees or less. Satisfying this very stringent angle accuracy (assembling accuracy) may make manufacturing more difficult or make requirements for accuracy of the part itself more stringent, resulting in a cost increase.

However, the method for manufacturing a wavelength division multiplexing transmission apparatus according to the first embodiment of the present invention executes a parallelism correction step, and can thereby improve parallelism of wavelength multiplexed light and increase coupling efficiency with respect to the optical fibers. Executing the parallelism correction step eliminates the necessity for stringently restricting the angle deviation produced in the light transmitting section and the optical multiplexing section, thus relaxing the assembling accuracy that should be satisfied. For example, when a collimator lens having a focal length of 0.5 mm is used, the allowable amount of positional deviation for the collimator lens is 0.3 μm, which can be relatively easily achieved using current manufacturing techniques.

Without being limited to wavelength division multiplexing of laser beams of four wavelengths, the present invention is applicable to wavelength division multiplexing of laser beams of a plurality of wavelengths. The plurality of reflectors are arranged so that laser beams travel in zigzags, but the arrangement of the reflectors is not limited to this as long as wavelength multiplexed light can be generated.

Second Embodiment

Since a method for manufacturing a wavelength division multiplexing transmission apparatus and the wavelength division multiplexing transmission apparatus according to a second embodiment of the present invention have many points common to those of the first embodiment, description will be focused on differences from the first embodiment. The method for manufacturing a wavelength division multiplexing transmission apparatus and the wavelength division multiplexing transmission apparatus according to the second embodiment of the present invention have a feature in the method for fixing the collimator lenses to the first substrate.

Figure 7:
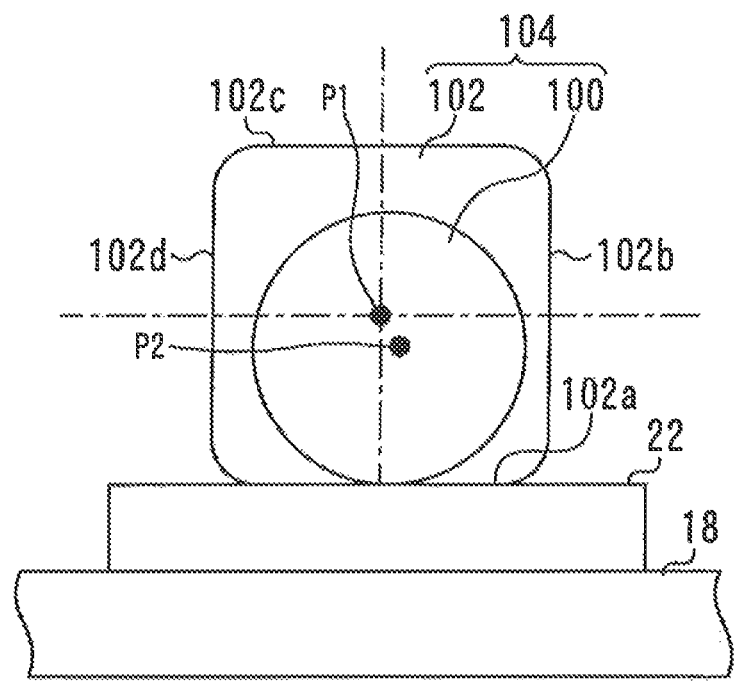
FIG. 7 is a diagram illustrating a method of fixing a collimator lens according to the second embodiment to the first substrate.

FIG. 7 is a diagram illustrating a method of fixing a collimator lens 100 according to the second embodiment of the present invention to the first substrate 18. The collimator lens 100 is surrounded by a frame body 102. The collimator lens 100 and the frame body 102 constitute a lens part 104. The frame body 102 has a rectangular outside shape. Thus, the frame body 102 has a first surface 102a, a second surface 102b, a third surface 102c, and a fourth surface 102d. The first surface 102a is fixed to the first substrate 18 via the second submount 22. For example, welding or an adhesive is used to fix the first surface 102a and the second submount 22 and to fix the second submount 22 and the first substrate 18.

The optical axis P2 of the collimator lens 100 is spaced from the center P1 of the outside shape of the frame body 102. For this reason, the position of the optical axis of the collimator lens 100 relative to the submount 22 is different when the first surface 102a is fixed to the second submount 22, than when the second surface 102b is fixed to the second submount 22, than when the third surface 102c is fixed to the second submount 22, and than when the fourth surface 102d is fixed to the second submount 22. In such cases, the location at which the lens part 104 is fixed to the second submount 22 need not be changed to change the position of the optical axis P2 of the collimator lens 100 with respect to the submount 22.

In the parallelism correction step, the parallelism of the wavelength multiplexed light can be easily improved by selecting, as appropriate, which surface of the outside shape of the frame body 102 is to be fixed to the first substrate 18 via the submount. Moreover, this selection of the surface and, thereby, of the position of the optical axis P2 relative to the first substrate 18 can be achieved by simply rotating the lens part 104 around the center P1 of the outside shape of the frame body 102, before fixing the frame body to the submount 22.

When coordinates of the outside shape center P1 of the frame body 102 are assumed to be (0, 0), the optical axis position P2 when the first surface 102a is fixed to the submount 22 is (X1, −Y1), the optical axis position P2 when the second surface 102b is fixed to the submount 22 is (−X1, −Y1), the optical axis position P2 when the third surface 102c is fixed to the submount 22 is (−X1, Y1) and the optical axis position P2 when the fourth surface 102d is fixed to the submount 22 is (X1, Y1). Therefore, it is possible to adjust the optical axis position P2 in four stages.

Figure 8:
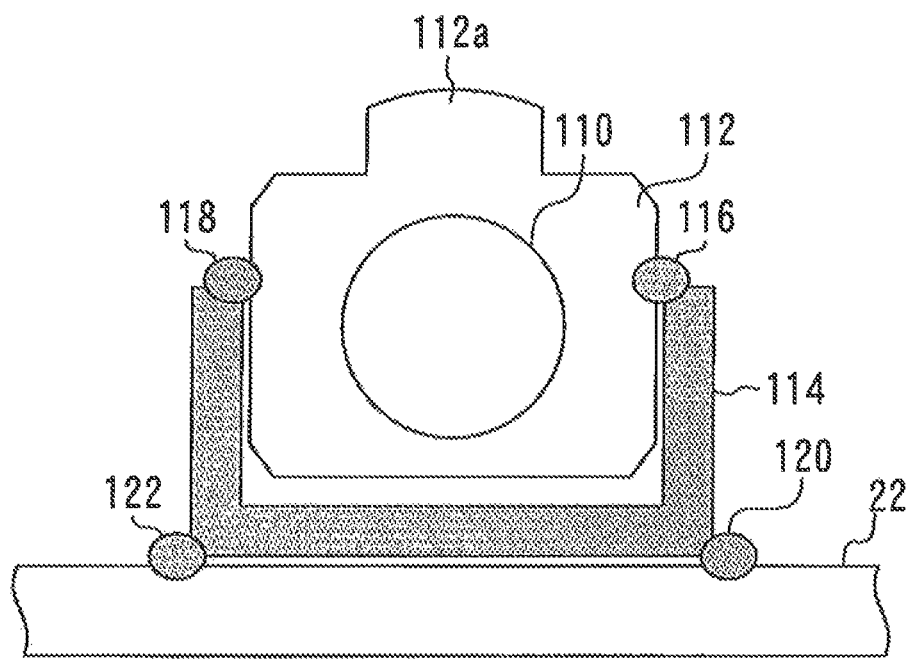
FIG. 8 is a front view of a lens part according to a comparative example.

Here, a comparative example will be described. FIG. 8 is a front view of a lens part according to a comparative example. A collimator lens 110 is surrounded by a frame body 112 having a top protrusion section 112a. While holding the top protrusion section 112a by tweezers or the like, its position is adjusted in vertical and horizontal directions via a concave holder 114. Then, the frame body 112 and the holder 114, and the holder 114 and the submount 22 are fixed using a method such as laser welding. For example, welded parts 116, 118, 120 and 122 are formed by welding.

In the case of the comparative example, the collimator lens 110, the frame body 112 and the holder 114 are necessary, which causes the width of the lens part to increase. Lining a plurality of lens parts having a large width results in a problem of increasing the size of the wavelength division multiplexing transmission apparatus. However, the lens part 104 according to the second embodiment of the present invention directly fixes the frame body 102 to the submount 22, thus eliminating the necessity for the holder 114 in the comparative example. It is thereby possible to avoid upsizing of the wavelength division multiplexing transmission apparatus.

The outside shape of the frame body 102 only needs to be polygonal, and is not limited to be rectangular. In the case of a lens part having an N-sided polygonal outside shape, the position of the optical axis can be adjusted in N stages. Moreover, this lens part 104 may also be used for methods for manufacturing a wavelength division multiplexing transmission apparatus and the respective wavelength division multiplexing transmission apparatuses according to other embodiments.

Third Embodiment

Since a method for manufacturing a wavelength division multiplexing transmission apparatus and the wavelength division multiplexing transmission apparatus according to a third embodiment of the present invention have many points common to those of the first embodiment, description will be focused on differences from the first embodiment. The method for manufacturing a wavelength division multiplexing transmission apparatus and the wavelength division multiplexing transmission apparatus according to the third embodiment of the present invention are intended to correct positional deviations of laser beams making up wavelength multiplexed light.

Figure 9:
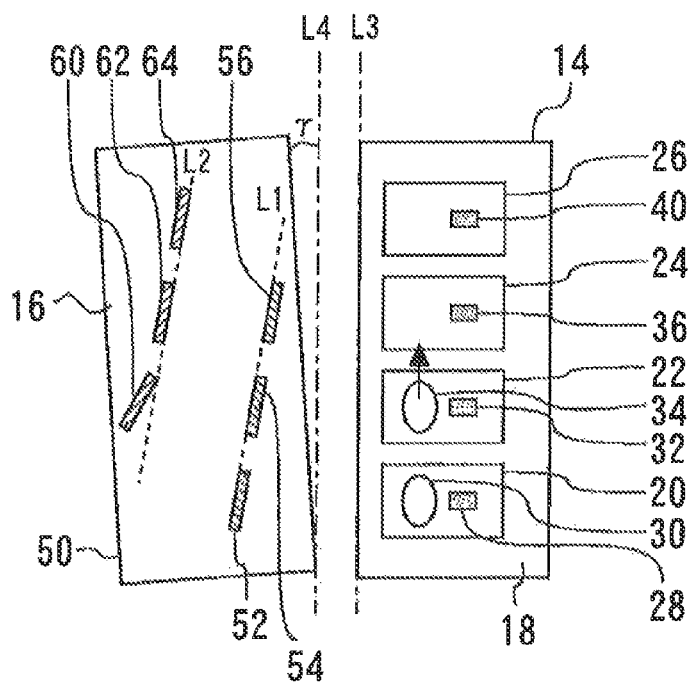
FIG. 9 is a plan view illustrating an inside of the package of the wavelength division multiplexing transmission apparatus according to the third embodiment.

FIG. 9 is a plan view illustrating an inside of the package of the wavelength division multiplexing transmission apparatus according to the third embodiment of the present invention. Single-dot dashed lines L3 and L4 are parallel. The optical multiplexing section 16 (second substrate 50) is inclined by an angle $\gamma$ with respect to the light transmitting section 14 (first substrate 18).

The method for manufacturing a wavelength division multiplexing transmission apparatus according to the third embodiment of the present invention will be described. First, a plurality of laser devices arranged in a line and collimator lenses. for laser beams emitted from the plurality of laser devices are fixed to the first substrate 18. This step is called a "first step." Next, a plurality of reflectors arranged so as to multiplex laser beams to generate wavelength multiplexed light are fixed to the second substrate 50. This step is called a "second step."

The laser beams making up the wavelength multiplexed light have certain intervals (positional deviations) because parts of the light transmitting section 14 (a plurality of laser devices, collimator lenses) or parts of the optical multiplexing section 16 (a plurality of reflectors) are slightly deviated from ideal fixing positions. Thus, an angle formed by the second substrate 50 with respect to the first substrate 18 is adjusted so as to reduce intervals of laser beams making up the wavelength multiplexed light after the first step and the second step. This step is called a "positional deviation correction step." The wavelength division multiplexing transmission apparatus in FIG. 9 is completed in this way.

Figure 10:
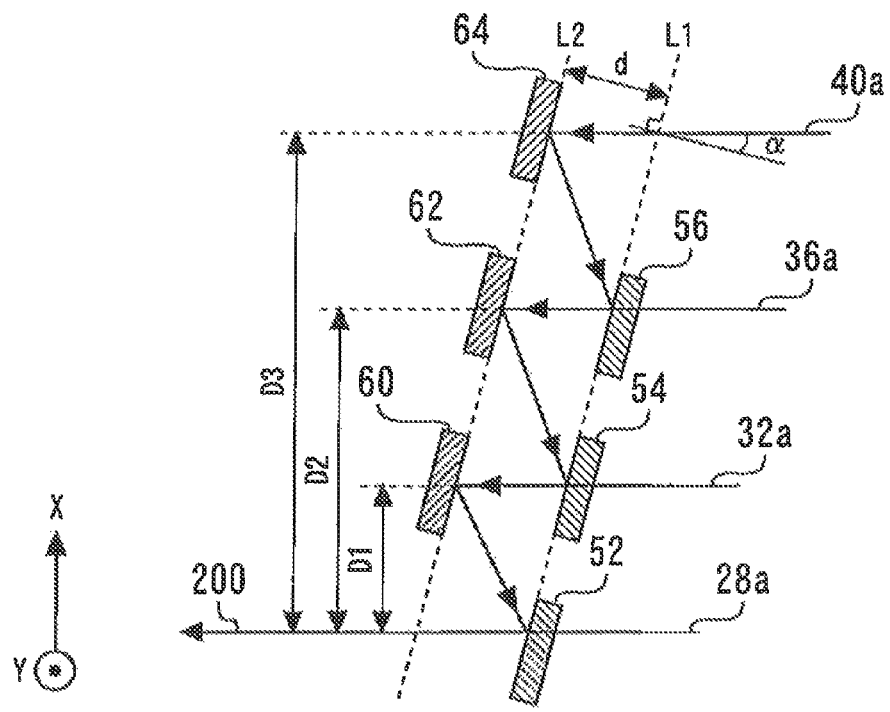
FIG. 10 is a diagram illustrating a distance between a position at which a laser beam impinges on the optical multiplexing section and a position at which wavelength multiplexed light exits from the optical multiplexing section.

FIG. 10 is a diagram illustrating a distance between a position at which a laser beam impinges on the optical multiplexing section and a position at which wavelength multiplexed light 200 exits from the optical multiplexing section. A broken line L1 and a broken line L2 are parallel. Suppose the distance between the broken line L1 and the broken line L2 is d. Suppose an angle formed by the laser beam incident on the optical multiplexing section with respect to the normal of the broken line L1 is $\alpha$.

D1 denotes a distance between a position at which a laser beam 32a emitted from the second laser device 32 impinges on the optical multiplexing section and a position at which it exits from the optical multiplexing section, and is expressed by the following expression:

$$D1 = 2d \sin \alpha$$

D2 denotes a distance between a position at which a laser beam 36a emitted from the third laser device 36 impinges on the optical multiplexing section and a position at which it exits from the optical multiplexing section, and is expressed by the following expression:

$$D2 = 4d \sin \alpha$$

D3 denotes a distance between a position at which a laser beam 40a emitted from the fourth laser device 40 impinges on the optical multiplexing section and a position at which it exits from the optical multiplexing section, and is expressed by the following expression:

$$D3 = 6d \sin \alpha$$

When the value of $\gamma$ is changed by rotating the second substrate 50 with respect to the first substrate 18, the broken line L1 and the broken line L2 also rotate, and the value of $\alpha$ is thereby changed. This change causes D2 to change twice D1 and causes D3 to change three times D1. Taking advantage of this nature, the interval between laser beams making up the wavelength multiplexed light (positional deviation) is reduced. The laser beam 28a emitted from the first laser device 28 is never reflected by the optical multiplexing section 16, and therefore the position of the laser beam 28a does not depend on $\gamma$. Thus, the positions of laser beams emitted from the other laser devices are changed so as to reduce the positional deviation respect with to the laser beam 28a.

Figure 11:
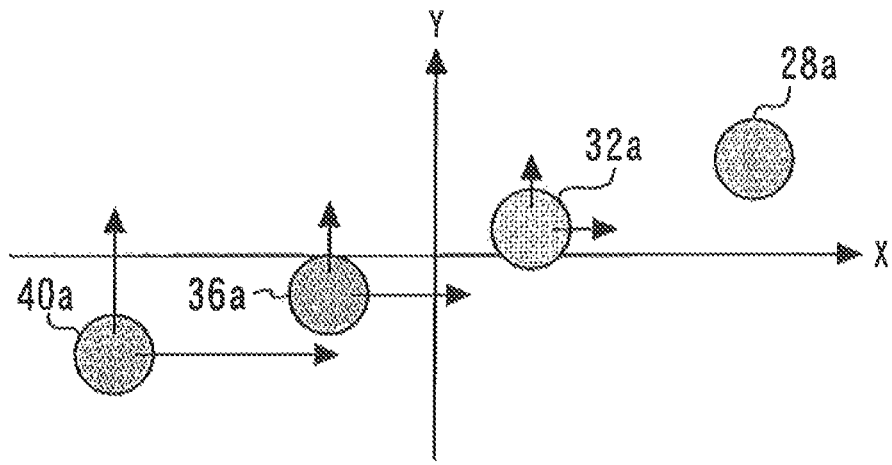
FIG. 11 shows four laser beams incident on the XY plane in FIG. 10.

FIG. 11 is a diagram illustrating laser beams making up wavelength multiplexed light. FIG. 11 shows four laser beams incident on the KY plane in FIG. 10. If the optical multiplexing section is inclined with respect to the X-axis, the laser beams 32a, 36a and 40a can be moved in the X direction. Regarding the Y direction, intervals (positional deviations) between laser beams making up the wavelength multiplexed light need to be reduced. Thus, if the optical multiplexing section is inclined with respect to the Y-axis, the laser beams 32a, 36a and 40a can be moved in the Y direction.

Figure 12:
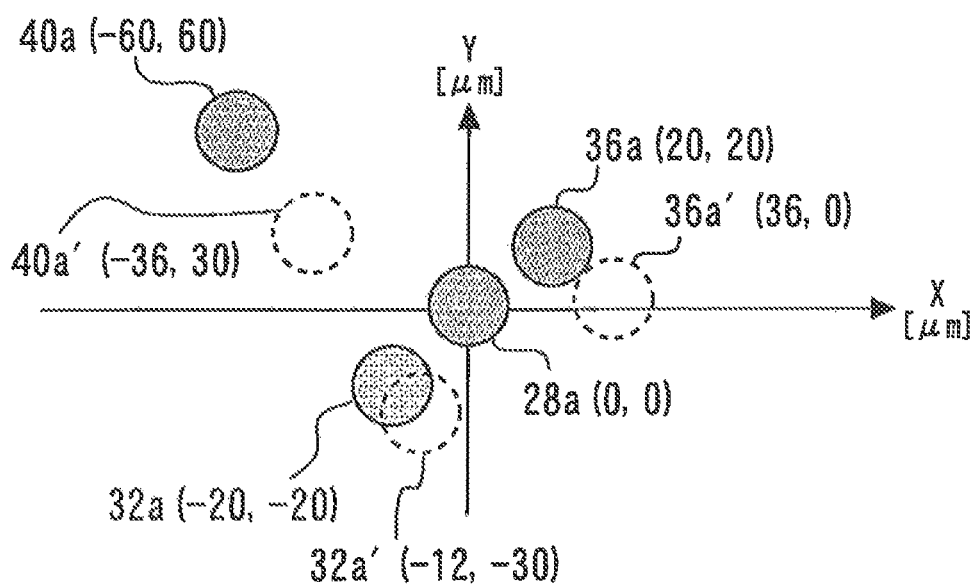
FIG. 12 shows that laser beams making up wavelength multiplexed light are distributed at positions shown by solid lines.

Next, suppose, for example, a case where laser beams making up wavelength multiplexed light are distributed at positions shown by solid lines in FIG. 12. The position of the laser beam 28a is assumed to be the origin. The laser beam 40a is farthest from the origin and the distance is approximately 85 μm. To reduce the interval (positional deviation) between laser beams making up the wavelength multiplexed light, the laser beam 40a must be moved toward the laser beam 28a.

Thus, the optical multiplexing section is inclined with respect to the X-axis and Y-axis. This causes the laser beam 32a to move +8 μm in the X direction, −10 μm in the Y direction, and a laser beam 32a' after movement is positioned at (−12, −30). Since the laser beam 36a changes twice the laser beam 32a, the laser beam 36a moves +16 μm in the X direction and −20 μM in the Y direction. A laser beam 36a' after movement is positioned at (36, 0).

Since the laser beam 40a changes three times the laser beam 32a, the laser beam 40a moves +24 μm in the X direction and −30 μm in the Y direction. A laser beam 38a' after movement is positioned at (−36, 30). This reduces the distance of the laser beam 40' from the origin down to approximately 47 μm.

Figure 13:
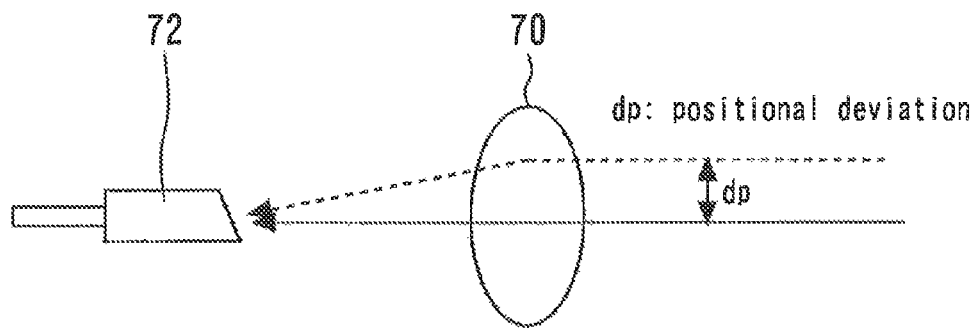
FIG. 13 is a diagram illustrating a positional deviation of laser beams making up the wavelength multiplexed light.
Figure 14:
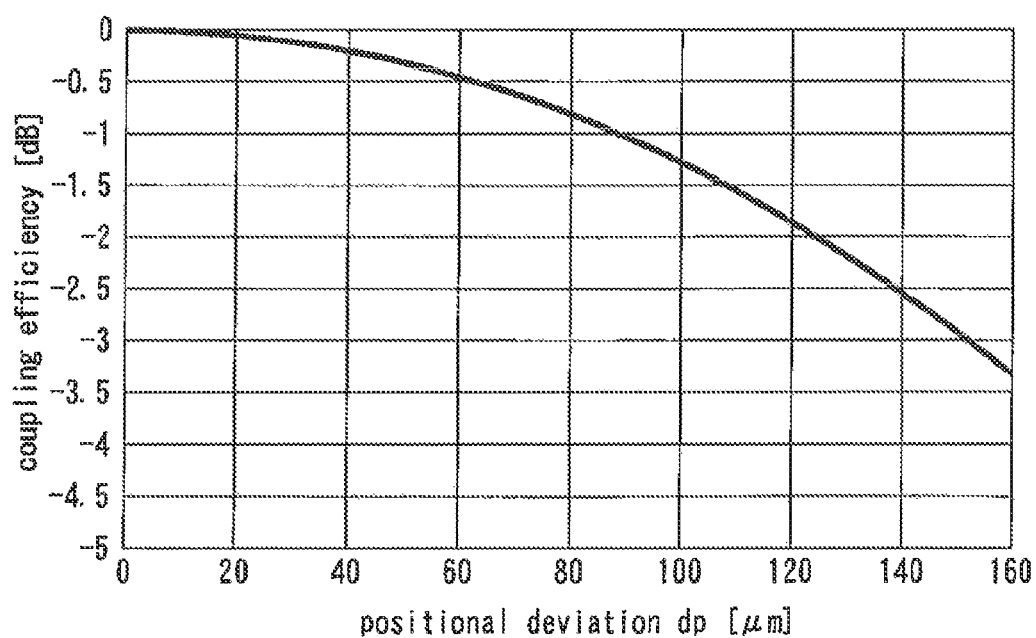
FIG. 14 is a graph showing calculation results of the amount of positional deviation and coupling efficiency with respect to the optical fiber.

FIG. 13 is a diagram illustrating a positional deviation of laser beams making up the wavelength multiplexed light. Here, suppose a condensing lens 70 having a focal length of 2 mm is used. Suppose the amount of positional deviation between the laser beams is dp. FIG. 14 is a graph showing calculation results of the amount of positional deviation dp and coupling efficiency with respect to the optical fiber. In order to reduce coupling loss due to the positional deviation with respect to the condensing lens 70 to 0.5 dB or less, the amount of positional deviation must be set to 60 μm or less. As has also been mentioned in the first embodiment, attempting to increase the assembling accuracy of the optical transmitting section and the optical multiplexing section to reduce the amount of positional deviation to 60 μm or less may result in difficulty in manufacturing and a cost increase.

The method for manufacturing a wavelength division multiplexing transmission apparatus according to the third embodiment of the present invention executes the positional deviation correction step and thereby reduces the interval (positional deviation) between laser beams making up wavelength multiplexed light. Therefore, it is possible to increase the coupling efficiency of wavelength multiplexed light with respect to the optical fiber while relaxing the assembling accuracy that should be satisfied.

In the example shown in FIG. 12, the distance between the laser beam 40a and the origin (amount of positional deviation dp) can be reduced from approximately 85 μm to 47 μm, and therefore the coupling efficiency improves from 1 dB to 0.3 dB. Moreover, it is not necessary to solve the problem that the light transmitting section and the part of the optical multiplexing section slightly deviate from ideal fixing positions, and the assembling accuracy need not be controlled stringently, and the assembling accuracy can rather be relaxed compared to the prior art. Note that γ is changed by 1 degree, for example, the laser beam 32a moves approximately 105 μm, the laser beam 36a moves approximately 209 μm, and the laser beam 40a moves approximately 314 μm.

Fourth Embodiment

Figure 15:
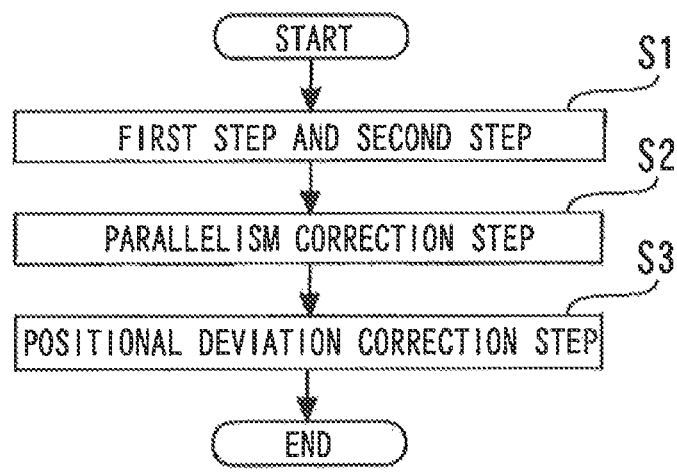
FIG. 15 is a flowchart of a method for manufacturing a wavelength division multiplexing transmission apparatus according to a fourth embodiment.

FIG. 15 is a flowchart of a method for manufacturing a wavelength division multiplexing transmission apparatus according to a fourth embodiment of the present invention. The method for manufacturing a wavelength division multiplexing transmission apparatus according to the fourth embodiment of the present invention first executes the first step and the second step according to the first embodiment (step 1). Next, the parallelism correction step described in the first embodiment is executed (step S2). Note that, in the parallelism correction step, the optical multiplexing section 16 is not fixed to the second substrate 50 but is temporarily placed on the second substrate 50.

Figure 16:
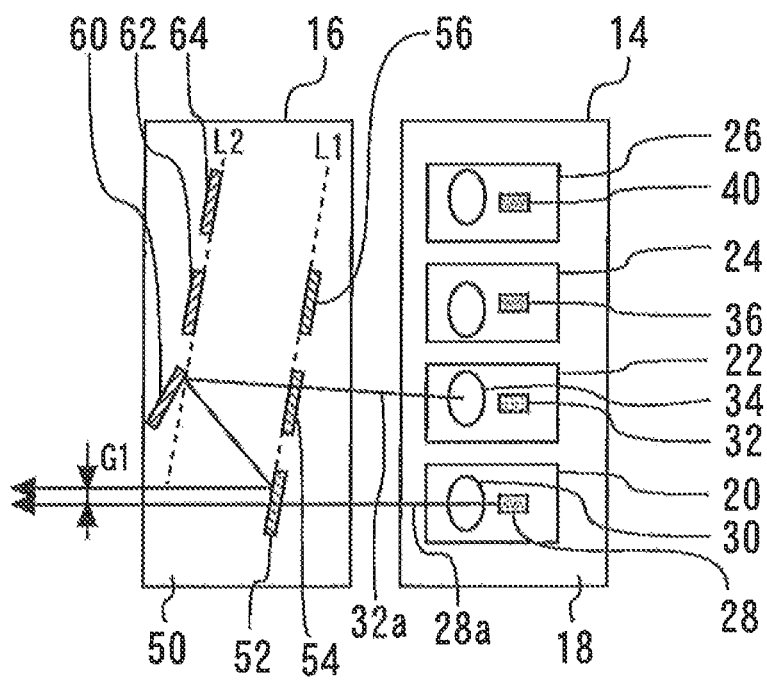
FIG. 16 is a plan view illustrating laser beams.

FIG. 16 is a plan view illustrating laser beams after ending step S2. While the laser beam 28a and the laser beam 32 are parallel, there is a positional deviation (gap G1). The laser beam emitted from the third laser device 36 and the laser beam emitted from the fourth laser device 40 also produce a positional deviation with respect to the laser beam 28a. The laser beam emitted from the fourth laser device 40 in particular is reflected by most reflectors, and therefore receives greater influences of errors in the attachment positions of the reflectors. Thus, the positional deviation is also greatest. Such a positional deviation may lead to a reduction of coupling efficiency with respect to the optical fiber, and therefore should be corrected.

Thus, the method for manufacturing a wavelength division multiplexing transmission apparatus according to the fourth embodiment of the present invention executes the positional deviation correction step described in the third embodiment after the parallelism correction step (step S3). In this way, the method for manufacturing a wavelength division multiplexing transmission apparatus according to the fourth embodiment of the present invention corrects a positional deviation after the parallelism correction step, and can thereby obtain wavelength multiplexed light with a high degree of parallelism and less positional deviation. Moreover, the assembling accuracy need not be increased to obtain this effect, and can rather relax the assembling accuracy that should be satisfied.

According to the present invention, it is possible to increase coupling efficiency of wavelength multiplexed light with respect to an optical fiber while relaxing assembling accuracy that should be satisfied by a wavelength division multiplexing transmission apparatus.

Obviously many modifications and variations of the present invention are possible in the light of the above teachings. It is therefore to be understood that within the scope of the appended claims the invention may be practiced otherwise than as specifically described.

The entire disclosure of Japanese Patent Application No. 2013-460427, filed on Aug. 1, 2013 including specification, claims, drawings and summary, on which the Convention priority of the present is based, is incorporated herein by reference in its entirety.

What is claimed is:

1. A method for manufacturing a wavelength division multiplexing transmission apparatus, the method comprising, sequentially:
   positioning a plurality of laser devices along a line and fixing the laser devices to a first substrate;
   fixing a plurality of reflectors to a second substrate, wherein the reflectors are located at positions on the second substrate to multiplex laser beams emitted from the plurality of laser devices and to generate wavelength multiplexed light;
   placing a plurality of collimator lenses on the first substrate with a respective collimator lens in a respective path of each of the respective laser beams produced by the respective laser devices;
   adjusting position of at least one of the collimator lenses in a direction that is transverse to the laser beam incident on the collimator lens so that the laser beams making up the wavelength multiplexed light are parallel to each other in the multiplexed light; and
   after adjusting the position of at least one of the collimator lenses in a direction that is transverse to the laser beam incident on the respective collimator lens, fixing the collimator lenses to the first substrate.

2. The method for manufacturing a wavelength division multiplexing transmission apparatus according to claim 1, further comprising adjusting an angle formed by the second substrate with respect to the first substrate to reduce spacing between the laser beams making up the wavelength multiplexed light, after fixing the collimator lenses to the first substrate.

3. A method for manufacturing a wavelength division multiplexing transmission apparatus, the method comprising:
   positioning a plurality of laser devices along a line and fixing the laser devices to a first substrate;

fixing a plurality of reflectors to a second substrate, wherein the reflectors are located at positions on the second substrate to multiplex laser beams emitted from the plurality of laser devices and to generate wavelength multiplexed light;

mounting each of a plurality of collimator lenses in a respective frame body that peripherally surrounds the respective collimator lens to form a plurality of lens parts, each lens part including a collimator lens mounted in a frame body, wherein each of the collimator lenses has a respective optical axis, each of the frame bodies has a center with respect to an outside shape of the frame body, each of the frame bodies has a polygonal outside shape including a plurality of flat surfaces, and in each of the lens parts, the optical axis of the collimator lens is spaced from the center of the frame body so that, when the lens part is fixed to the first substrate, distance from the first substrate to the optical axis of the respective collimator lens depends upon which surface of the frame body is mounted on the first substrate;

selecting the surfaces of the respective frame bodies to be fixed to the first substrate so that the laser beams making up the wavelength multiplexed light will be parallel to each other in the multiplexed light when the frame bodies are fixed to the first substrate; and fixing the lens parts at the respective surfaces of the lens parts that have been selected to the first substrate so that the laser beams making up the wavelength multiplexed light are parallel to each other in the multiplexed light.

4. A wavelength division multiplexing transmission apparatus comprising:

a first substrate;

a plurality of laser devices positioned along a line and fixed to the first substrate;

a plurality of lens parts, wherein each lens part includes a collimator lens that collimates a respective laser beam emitted from a respective one of the plurality of laser devices, and a frame body surrounding the collimator lens and having a polygonal outer shape including a plurality of flat surfaces, wherein each of the collimator lenses has a respective optical axis, each of the frame bodies has a center with respect to the polygonal outer shape of the frame body, in each of the lens parts, the optical axis of the collimator lens is spaced from the center of the frame body so that, when the lens part is fixed to the first substrate, distance from the first substrate to the optical axis of the respective collimator lens depends upon which surface of the frame body is mounted on the first substrate, and one of surfaces of the polygonal outer shape of each of the lens parts is fixed to the first substrate;

a second substrate; and a plurality of reflectors that are fixed to the second substrate and multiplex the laser beams to generate wavelength multiplexed light, wherein the surfaces of the respective frame bodies fixed to the first substrate adjust the laser beams making up the wavelength multiplexed light to be parallel to each other in the multiplexed light.

* * * * *